United States Patent [19]

Ishiwata

[11] Patent Number: 5,351,600

[45] Date of Patent: * Oct. 4, 1994

[54] HYDRAULIC BOOSTER FOR VEHICLE

[75] Inventor: Ichiro Ishiwata, Yokosuka, Japan

[73] Assignee: Nippon Air Brake Co., Ltd., Kobe, Japan

[*] Notice: The portion of the term of this patent subsequent to Feb. 4, 2011 has been disclaimed.

[21] Appl. No.: 983,295

[22] Filed: Nov. 30, 1992

Related U.S. Application Data

[63] Continuation of Ser. No. 691,645, Apr. 25, 1991, abandoned.

[30] Foreign Application Priority Data

Oct. 27, 1989 [JP] Japan .................. 1-280623

[51] Int. Cl.[5] .................. F15B 9/10; B60T 13/00
[52] U.S. Cl. .................. 91/369.1; 91/376 R; 60/547.1; 60/571
[58] Field of Search .................. 91/369.1, 376 R; 60/585, 589, 588, 571, 584, 591, 555, 547.1

[56] References Cited

U.S. PATENT DOCUMENTS

| 4,468,927 | 9/1984 | Farr | 60/547.1 |
| 4,514,981 | 5/1985 | Brown et al. | 60/547.1 |
| 4,637,208 | 1/1987 | Kervagoret | 60/547.1 |
| 4,656,923 | 4/1987 | Tsuyuki et al. | 91/369.1 |
| 4,773,223 | 9/1988 | Mizusawa et al. | 91/369.1 |

FOREIGN PATENT DOCUMENTS

| 2203794 | 5/1982 | Fed. Rep. of Germany | 91/376 R |
| 2-68258 | 3/1990 | Japan . | |

Primary Examiner—Edward K. Look
Assistant Examiner—Hoang Nguyen
Attorney, Agent, or Firm—Carothers & Carothers

[57] ABSTRACT

A hydraulic booster for a vehicle and more particularly an improved hydraulic booster with improved brake-relieving action, among other improvements.

8 Claims, 7 Drawing Sheets

HYDRAULIC BOOSTER FOR VEHICLE

This application is a file wrapper continuation application for prior patent application Ser. No. 07/691,645, filed on Apr. 25, 1991, now abandoned.

BACKGROUND OF THE INVENTION

1. Field of the Invention

This invention relates to a hydraulic booster for vehicle which assists the vehicle driver with the operation of the master cylinder.

2. Description of the Prior Art

Japanese Patent Application No. 217892/1988 (Japanese Patent Opening Gazzette No. 68258/1990) discloses a hydraulic booster in which a second valve apparatus is arranged at a reaction chamber formed adjacent to a top end of an input member in order to reduce the initial drive force required to develop master cylinder pressure. The second valve apparatus prevents pressure-fluid from flowing into the reaction chamber until the pressure of fluid in the pressure-servo chamber becomes higher than a predetermined pressure. Thus, a force applied to the input member before the master cylinder pressure starts to rise, can be smaller. When the second valve apparatus is opened, there occurs the so-called "Jump-up phenomenon" in which the master cylinder pressure steeply rises up to a certain pressure.

When the pressure of the servo-chamber is lowered to relieve the braking action, the pressurized fluid from the servo-chamber is returned into the fluid pressure-releasing source arranged at the downstream side of the second valve apparatus. Accordingly, the flow amount of the pressurized fluid is increased, since the pressurized fluid is discharged also from the reaction chamber. Abnormal sound is made from the second valve apparatus. Further, since the fluid amount is much, there is the disadvantage that the brake-relieving action lags.

SUMMARY OF THE INVENTION

It is an object of this invention to provide a hydraulic booster for vehicle in which the brake-relieving action can be improved and the abnormal sound is not made.

In accordance with an aspect of this invention, a hydraulic booster for a vehicle comprises:

(A) a cylinder body having a cylindrical bore; (B) a piston slidably fitted into said cylindrical bore; (C) a pressure-servo chamber formed at one side of said cylindrical bore by said piston; (D) a valve hole made in the side of said pressure-servo chamber in said piston; (E) pressure supply path means extending into said valve hole and communicating with a fluid pressure source; (F) pressure discharge path means extending into said valve hole and communicating with a pressure-relieving source; (G) an input member passing through said pressure-servo chamber and entering said valve hole; (H) pressure-supply valve means arranged in said valve hole for opening and closing the path between said pressure supply means and said pressure-servo chamber in response to the movement of said input member; (I) pressure-discharge valve means arranged in said valve hole for opening and closing the path between said pressure discharge path means and said pressure-servo chamber in response to the movement of said input member; (J) a reaction chamber in which said input member is able to receive the pressure-servo chamber side pressure of said pressure-supply valve means in a direction against the input direction of said input member; and (K) valve apparatus arranged in a path to said reaction chamber and preventing fluid pressure from transmitting into said reaction chamber at a lower fluid pressure than a predetermined pressure, wherein by-pass means is arranged for connecting said pressure-servo chamber with said pressure-discharge valve means without passing through said reaction chamber.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
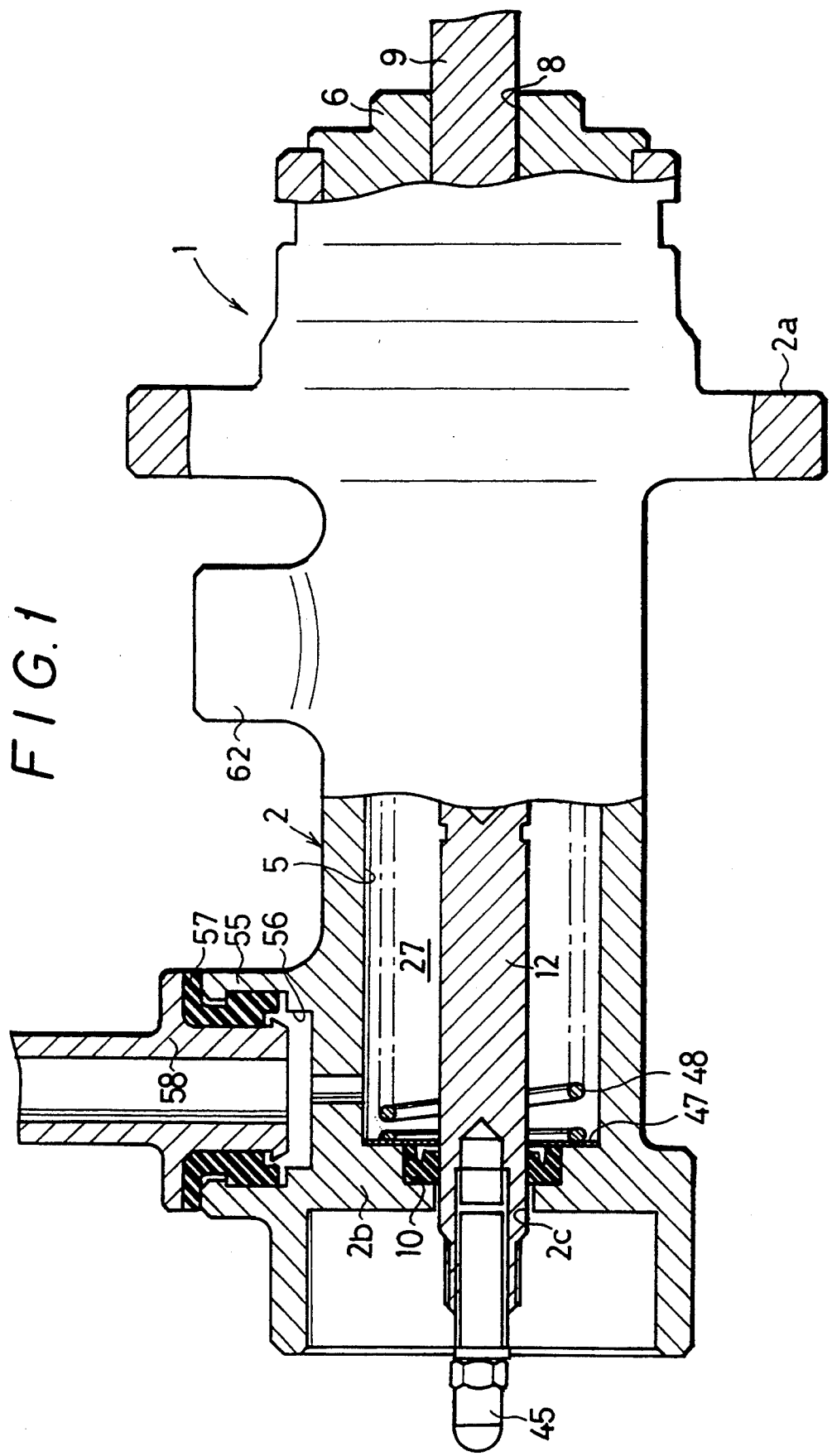
FIG. 1 is a partially-broken side view of a hydraulic booster according to one embodiment of this invention.

Next, a hydraulic booster for a vehicle according to one embodiment of this invention will be described with reference to the drawings.

In the drawings, the whole apparatus of this embodiment is represented generally by a reference numeral 1. A stepped cylinder bore 5 is made in a cylinder body 2. The rear end opening of the cylinder body 2 is covered with a cover member 6. The cover member 6, provided with an O-ring 16 (FIG. 2), is fixed to the cylinder body 2 by screws (not shown). The whole apparatus is suitably fixed to a toe-board (not shown).

A rod-like input member 9 extends through a cup-seal 11 and is slidably fitted within a central through hole 8 of the cover member 6 for movement forward and backward. In this description, "forward" "front", and variants thereof mean "leftward" and "backward" "rearward", and variants thereof mean "rightward".

The cylinder bore 5 of the body 2 includes a larger-diameter bore portion 17 to which the cover member 6 is fitted, and a smaller-diameter bore portion 18 as its major part. A piston 19 is slidably fitted through into the larger-diameter bore portion 17 and into the smaller-diameter bore portion 18.

The piston 19 has a first larger-diameter portion 25 at it's rear end and a second larger-diameter portion 26 at it's front end. Seal rings 25 and 26 are fitted into the first and second larger-diameter portions 20a and 20b respectively. Rings 26a and 26b of synthetic resin such as Teflon (Trademark) brand are further fitted on the peripheries of the seal rings 20a and 20b to reduce the sliding resistance of the piston 19.

An accumulator pressure chamber 28 is made between the first larger-diameter portion 25 and the second larger-diameter portion 26, and a pressure-servo chamber 29 is made between the first larger-diameter portion 25 and the cover member 6.

On the other hand, a rod member 12 extends through a cup seal 10 (FIG. 1) is slidably fitted into a hole 2c made in a bottom wall portion 2b of the cylinder body 2. A bolt 45 is screwed to a head portion of the rod member 12, and is engageable with a piston (not shown) of a master cylinder.

A non-pressure chamber 27 is made between the second larger-diameter portion 26 of the piston 19 and the bottom wall portion 2b of the cylinder body 2. A cup-shaped and an annular spring receiver 46 and 47, respectively are arranged at the front end of the piston 19 and at the inner side of bottom wall 2b of the cylinder body 2, respectively. A spring 48 is extended under compressed condition between the spring receivers 46 and 47. A boss portion 55 is made at the upper wall portion of the front part of the cylinder body 2. A fluid connecting port 56 of the boss portion 55 always communicates through a drain hole 55a made in the wall portion of the cylinder body 2, with the non-pressure chamber 27. A "Grommet" seal 57 is compressedly fitted into the fluid connecting port 56. A nipple 58 for connection to a not-shown reservoir is received in the "Grommet" seal 57.

Figure 7:
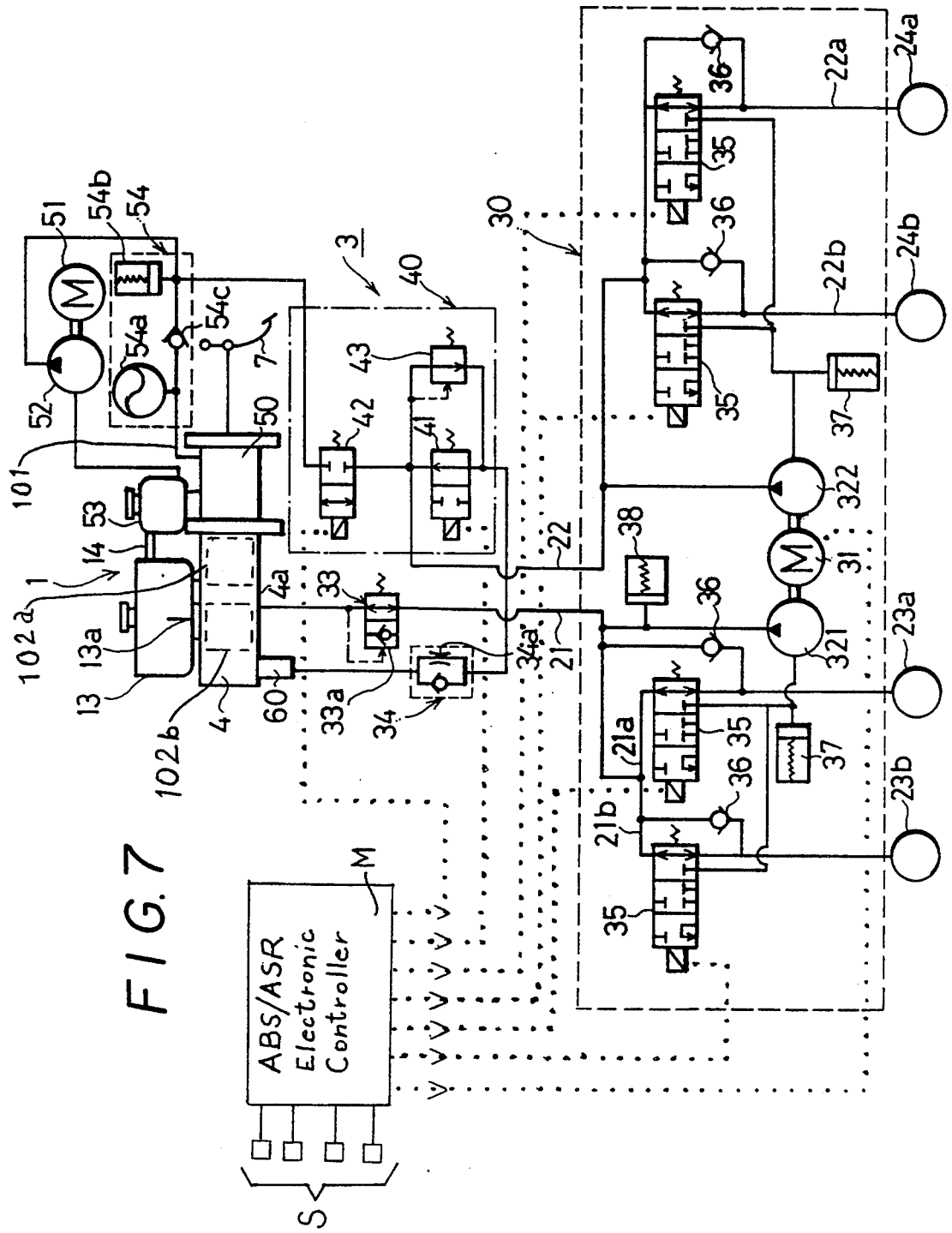
FIG. 7 is a conduit diagram of a brake control system to which the hydraulic booster of FIG. 1 is applied.

The piston 19 is a main constituent of the hydraulic booster 1. A boss portion 62 is made above the accumulator pressure chamber 28 in the cylinder body 2. One end of a conduit 101 is connected to the boss portion 62. The other end of the conduit 101 is connected to an accumulator 54 (FIG. 7). Pressurized fluid is stored in the not-shown accumulator 54 always under the predetermined range of pressure. A check valve V consisting of a ball Q and a spring T is arranged in the boss portion 62. It permits fluid to flow in the direction from the upper towards the lower in FIG. 2 so that the fluid can communicate through a path 62a with the accumulator pressure chamber 28. Thus, pressurized fluid in the accumulator pressure chamber 28 is prevented from flowing toward the hydraulic accumulator 54 side when the fluid pressure of the hydraulic accumulator 54 side may become lower than that of the accumulator pressure chamber 28.

A stepped axial valve hole 64 is made in the rear side of the piston 19. A movable valve body 67 is slidably fitted within a smaller-diameter hole portion 65 through a seal member 99 and into an intermediate-diameter hole portion 66 of the valve hole 64. The smaller-diameter hole portion 65 of the valve hole 64 communicates through an axial hole 12a of the rod member 12 and a radial path 39 with the non-pressure chamber 27. A ring of synthetic resin such as Teflon (Trademark) is overlapped on the seal member 99 of rubber, so as to reduce the sliding resistance of the movable valve body 67. A through axial hole 67c is made in the movable valve body 67 and it communicates with the non-pressure chamber 27. A spring receiver ring 59 is arranged at the step between smaller-diameter hole portion 65 of the valve hole 64 and the intermediate-diameter hole portion 66 thereof so as to contact with the seal member 99. A valve spring 68 is compressedly extended between the spring receiver ring 59 and an annular projecting portion 67a formed on the peripheral portion of the movable valve body 67. Thus, the movable valve body 67 is urged backwards. A valve guide member 75 provided with a seal ring 74 in a radially open peripheral groove is securely fitted into a rear opening portion of the valve hole 64 of the piston 19, and a sleeve member 80 is closely fitted into the valve guide member 75 as one body.

The sleeve member 80 is prevented from falling off by a stopper member 76 screwed to the rear end opening of the piston 19. The intermediate portion of the movable valve body 67 is slidably disposed within a central axial hole 100 of the valve guide member 75. The rear end of the movable valve body 67 is facing to a tapered recess 78 as a valve seat of a valve seat member 81 which is flitted into the front end portion of the input member 9. The annular projecting portion 67a of the movable valve body 67 contacts with a valve seat 75a formed at a front end of the axial hole 100 of the valve guide member 75, so that the relative rearward most position of the movable valve body 67 with respect to the piston 19 is regulated.

An input chamber a is formed around the intermediate portion of the movable valve body 67, in the valve hole 64 of piston 19. The input chamber a always communicates through a path 69 made in the peripheral wall portion of the piston 19, with the accumulator pressure chamber 28. A communicating chamber b is formed between the valve guide member 75 and the sleeve member 80.

Figure 2:
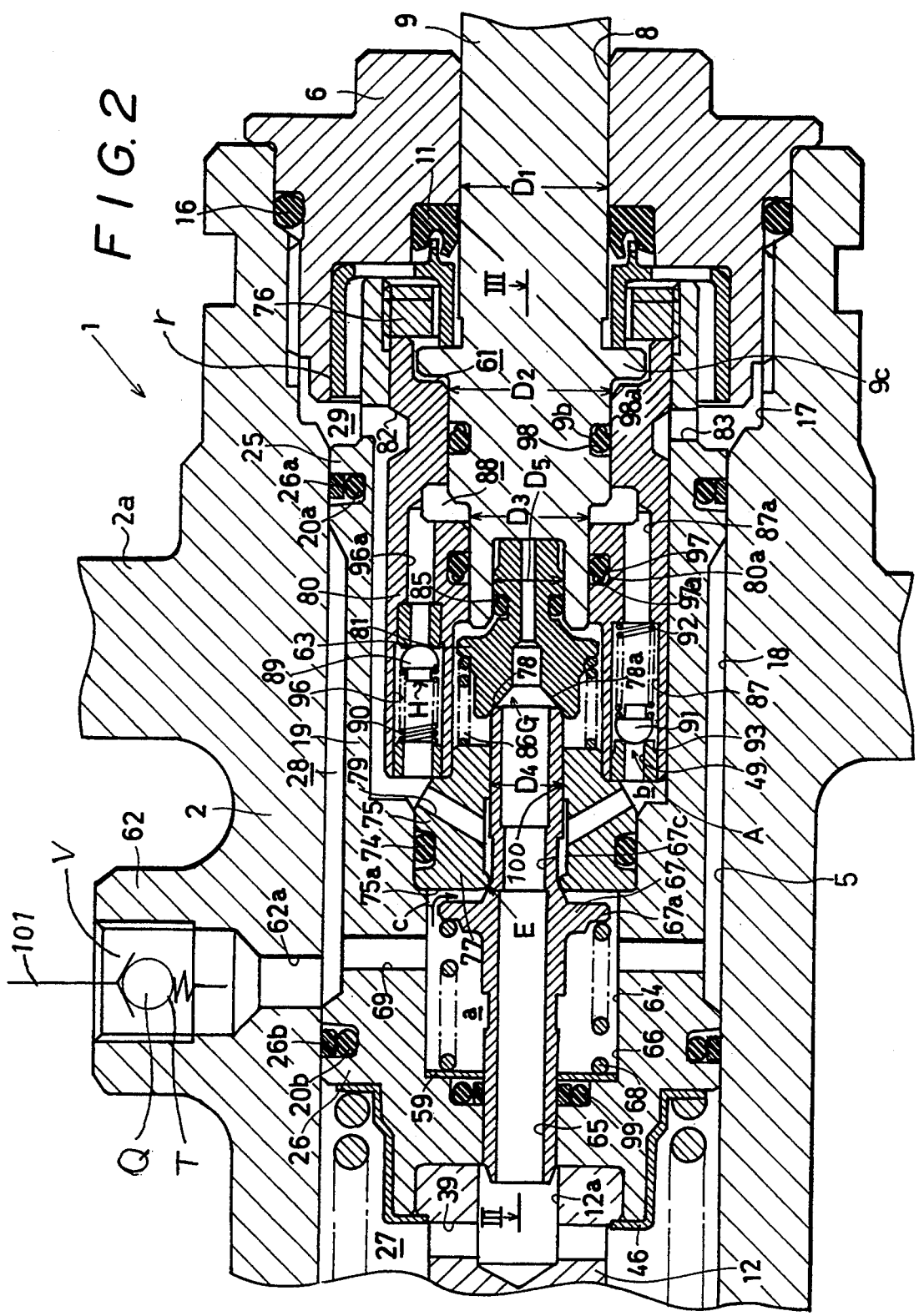
FIG. 2 is an enlarged cross-sectional view of an important part of the hydraulic booster of FIG. 1.
Figure 3:
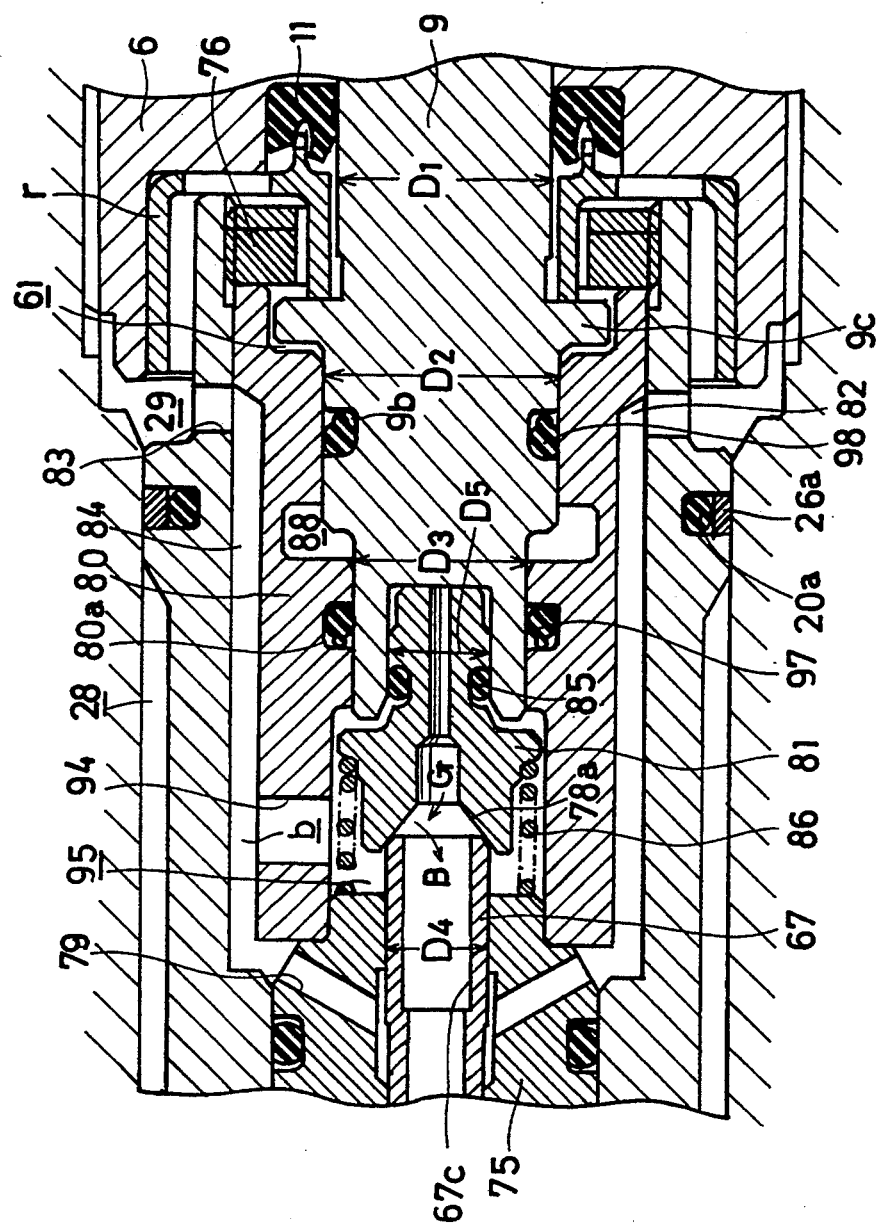
FIG. 3 is an enlarged cross-sectional view taken along the line III—III in FIG. 2.

A supply valve E is constituted by the annular projecting portion 67a of the movable valve body 67 and the valve seat 75a of the valve guide member 75. It is closed in the normal condition as shown in FIGS. 2 and 3. When it is opened, the fluid pressure transmitted into the input chamber a from the accumulater 54 as a fluid pressure source is transmitted through a pressure leading path C to the supply valve E into a recess 77 of the valve guide member 75. It is further supplied through a slant hole 79 of the valve guide member 75 into the pressure-servo chamber 29. A discharge valve G is formed by the rear end of the movable valve body 67 and a valve seat 78a which is formed by a tapered surface of the recess 78 of the valve seat member 81. It closes in the normal condition as shown in FIGS. 2 and 3.

As shown in FIG. 3, which is taken along the line III—III of FIG. 2, radial holes 94 are formed in the peripheral wall of the sleeve member 80. Further axial grooves 84 are formed in the peripheral wall of the sleeve member 80. They communicate with the radial holes 94. The right hand ends of the axial grooves 84 communicate with an annular groove 82 formed in the rear end portion of the sleeve member 80. Thus, a chamber 95 including a head portion of the valve seat member 81 and the discharge valve G communicates always through the radial holes 94, the axial groove 84, the annular groove 82 and radial holes 83 formed in the rear end portion of the piston 19 with the pressure-servo chamber 29.

Accordingly, the fluid pressure from the pressure-servo chamber 29 is transmitted into the chamber 95. When the discharge valve G is opened, the fluid pressure through the discharge valve G is introduced into a discharging path B communicating with the fluid pressure relieving source.

The valve seat member 81 provided with a seal ring 85 is slidably fitted into the front end portion of the input member 9. A spring 86 is extended under the compressed condition between the valve seat member 81 and the valve guide member 75. Thus, the valve seat member 81 is urged backwards. Axial paths 96 and 87 are formed in the peripheral wall portion of the sleeve member 80 as shown in FIG. 2 and further axial holes 96a and 87a are formed in the paths 96 and 87. An annular reaction chamber 88 is formed between the input member 9 and the sleeve member 80. The rear ends of the holes 96a and 87a communicate with the reaction chamber 88. Thus, the reaction chamber 88 communicates with recesses 96 and 87.

In the path 96, a valve body 89 and a spring 90 urging the valve body 89 are arranged and the former seats on a valve seat 63 in the non-operating condition. A check valve H is constituted by the valve body 89 and valve seat 63, and it permits fluid to flow from the reaction chamber 88 towards the communicating chamber b.

On the other hand, a valve body 91 and a spring 92 are arranged in the path 87. The valve body 91 is made to contact with a valve seat 93 by the spring 92 in the non-operating condition. Thus, a check valve A is constituted by the valve body 91, the valve seat 93 and the valve spring 92. A pressure fluid is prevented from transmitting to the reaction chamber 88 from the communicating chamber b under a lower pressure than a predetermined value.

Figure 4:
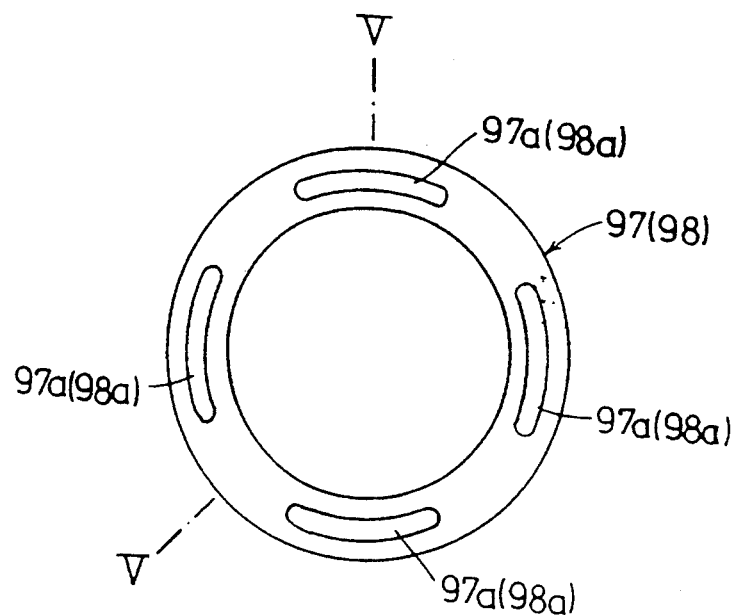
FIG. 4 is an enlarged front view of a seal member in the hydraulic booster in FIG. 2.
Figure 5:
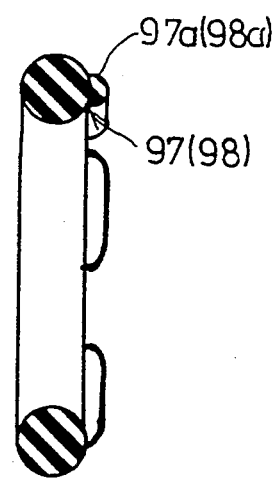
FIG. 5 is a cross-sectional view taken along the line V—V in FIG. 4.

On the other hand, an annular groove 80a is formed in an inside wall of the intermediate portion of the sleeve member 80 and a seal member 97 is fitted into the annular groove 80a. Further, an annular groove 9b is formed in the top end portion of the input member 9. A seal member 98 is fitted into the groove 9b. The seal members 97 and 98 are shown in FIG. 4, and FIG. 5 in the natural condition. They have four projecting portions 97a and 98a respectively, which work as elastic elements when they are pressed into the annular grooves 80a and 96. The seal members 97 and 98 are fitted into the annular grooves 80a and 96 of the piston guide member 80 and input member 9, respectively, in opposite manners. The diameter of the seal member 98 is larger than that of the seal member 97. A communicated chamber 61 is made between the reaction chamber 88 and pressure-servo chamber 29, and it is sealed from the reaction chamber 88 while it communicates with the pressure-servo chamber 29.

Next, there will be described operations and effects of the hydraulic booster 1 as above described.

In the non-operating condition, the respective parts are located at the shown positions. A flange portion 9c of the input member 9 is made to contact with a retainer r.

In the shown condition, when the driver depresses the brake pedal, the input member 9 is moved forwards at once and so the movable valve body 67 is pushed forwards through the valve seat member 81 by the front end of the input member 9, since the valve lift between the valve seat member 81 and the movable valve member 67 is zero. When the input member 9 is moved forwards, the movable valve body 67 is moved leftwards relative to the piston 19 against the spring force of the valve spring 68. Thus, the annular projecting portion 67a is separated from the valve seat 75a of the valve guide member 75. Thus, the supply valve E is opened and accordingly, the pressurized fluid from the input chamber a is led through the recess 77 and the slant hole 79 into the pressure-servo chamber 29. Thus, the right end surface of the piston 19 receives the fluid pressure and a leftward force is applied to the piston 19. The "Jump-up" phenomenon is prepared in the hydraulic booster 1.

When the supply valve E is opened and so a pressure of the pressure-servo chamber 29 reaches the opening valve pressure of the valve A, the fluid pressure is introduced into the reaction chamber 88 and thus the "jump-up" phenomenon is completed in the hydraulic booster 1. Then, the "jump-up" phenomenon occurs also in the master cylinder side in accordance with the input transmitted from the hydraulic booster 1. When the check valve A is opened, the following fluid pressure F is applied to the input member 9.

If $D_1 = D_2$, $$F = (D_2 - D_3) \times (P_1 - P_2) + (D_3 - D_4) \times P_1$$

or if $D_1 < D_2$, $$F = (D_2 - D_3) \times (P_1 - P_2) + \{(D_3 - D_4) - (D_2 - D_1)\} \times P_1,$$

where $D_1$ is equal to the sealing area of the input member 9 by the cup seal 11, $D_2$ the sealing area of the input member 9 by the seal member 98, and $D_3$ the sealing area of the input member 9 by the seal member 97, $D_4$ the sealing area of the top end portion of the movable valve body 67 to the valve seat member 81, $D_5$ the sealing area of the input member 9 by the seal ring 85, $P_1$ the pressure of the pressure-servo chamber 29, $P_2$ the opening pressure of the check valve A, and $D_4$ is so predetermined as to be nearly equal to $D_5$.

Figure 6:
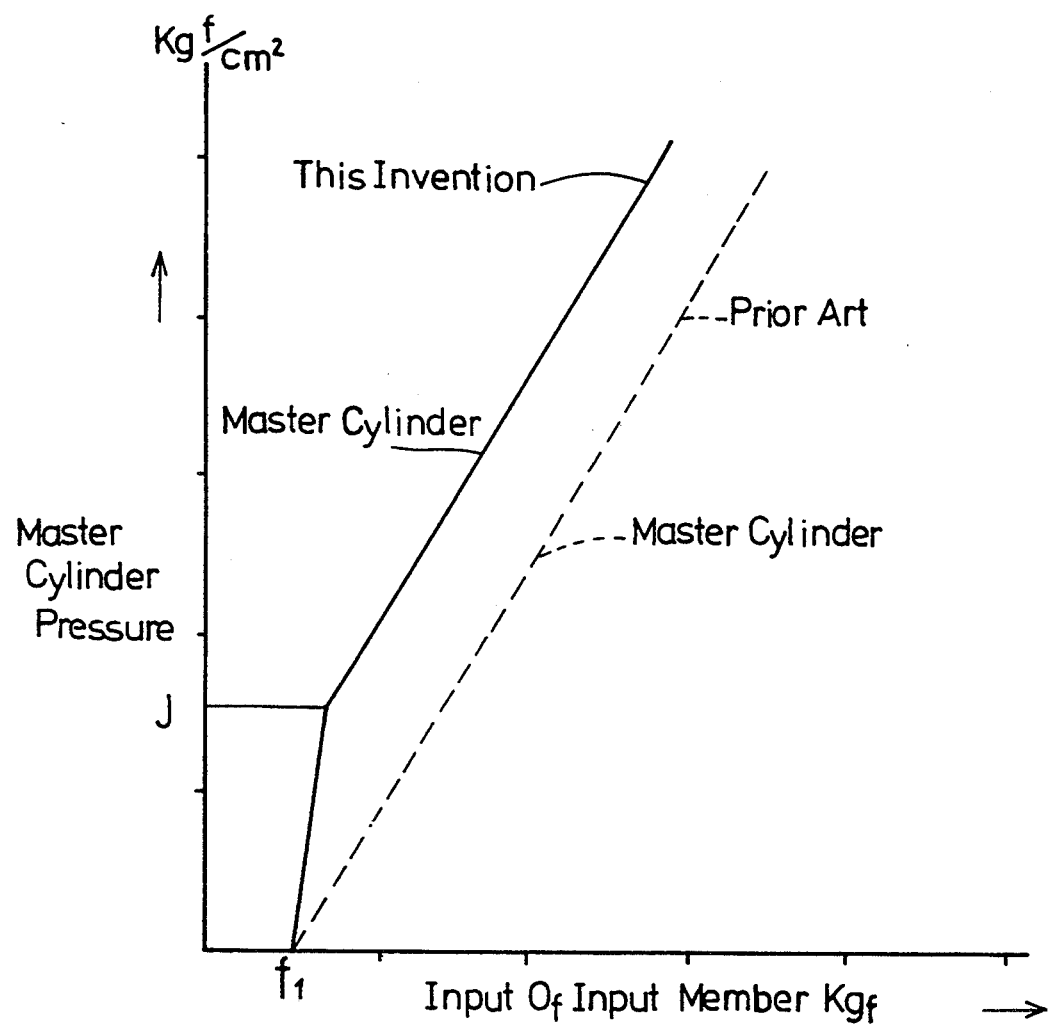
FIG. 6 a graph for comparing the operations of this invention and prior art.

As above described, in the hydraulic booster 1 according to this embodiment, when the input to the input member 9 reaches $f_1$, the master cylinder pressure steeply rises up to J as shown by the solid line in FIG. 6. Thus, "jump-up" phenomenon occurs at the input $f_1$. After the "jump-up" phenomenon ends, the master cylinder pressure rises linearly in proportion to the input in the same manner as the prior art hydraulic booster.

The height of the "jump-up" J corresponds to the sum of the different resistant forces as described below. Some sliding resistance is imparted to the piston 19 by the rings 26a and 26b of synthetic resin which are arranged in the annular grooves in the first and second larger-diameter portions 25 and 26 of the piston 19. Also the spring force of the spring 68 urging the movable valve body 67 is resistive to the forward movement of the input member 9. The sliding resistance of the synthetic resin rings overlapping the seal member 99 fitted to the movable valve body 67 and that of the cup-seal 11 fitted into the input member 9 function as resistance to the forward movement of the piston 19. The "jump-up" J corresponds to the sum of the above sliding resistances of the respective seal members and all of the spring forces of the respective springs.

When the hydraulic booster 1 is in the balanced condition, both the supply valve E and the discharge valve G close.

On the other hand, when the driver releases the brake pedal from treading to relieve the brake, the input member 9 is moved rightwards or backwards with the fluid pressure of the pressure-servo chamber 29 and reaction chamber 88, and the spring force of the spring 86. Accordingly, the discharge valve G is opened. Thus, the fluid pressure from the pressure-servo chamber 29 is returned to the reservoir side as the fluid pressure relieving source, through the communicating chamber b, the hole 94, the chamber 95 and the discharging path B (FIG. 3). When the fluid pressure from the pressure-servo chamber 29 is returned through the discharging path B into the reservoir side, the pressure difference between the pressure-servo chamber 29 and the reaction chamber 88 is increased, and when it reaches the opening valve pressure of the check valve H, the check valve H is opened and the pressurized fluid from the reaction chamber 88 is led into the communicating chamber b through the check valve H. It is returned through the discharging path B into the reservoir side.

Thus, the fluid pressure in the reaction chamber 88 becomes zero and the piston 19 and the input member 9 are moved back to the shown conditions and so the brake is relieved.

Next, a brake conduit system using the above described hydraulic booster will be described with reference to FIG. 7.

Hydraulic reservoirs 13 and 53 are arranged for the tandem master cylinder 4 and a hydraulic booster part 50. The reservoirs 13 and 53 are made to communicate with each other through a connecting path 14. The connecting path 14 is so arranged as to be levelled at the height of the inside partition wall 13a of the reservoir 13 of the tandem master cylinder 4. In consideration of the fact that the fluid is supplied and discharged between the master cylinder 4 and the hydraulic booster part 50, it is arranged for preventing over-flow of the fluid. Accordingly, when the reservoir 53 of the hydraulic booster and the reservoir 13 for the master cylinder are formed as one body, the central connecting path 14 can be omitted. In this embodiment, the oil pressure source for the hydraulic booster part 50 is used also for the ASR control operation. The oil pressure source includes a fluid pressure pump 52 for pressurizing fluid, an electric motor 51 driving the fluid pressure pump 52 and the hydraulic accumulator 54. The accumulator 54 consists of a membrane type accumulator 54a, a piston type accumulator 54b and a check valve 54c. The conduit type of this embodiment is of the front-rear separation type. Thus, in the tandem master cylinder 4, there are a primary piston 102a and a secondary piston 102b, being slidably fitted into a cylinder body. The primary piston 102a is pushed by the rod member 12 and bolt 45 (refer to FIG. 1) and it is moved leftwards (FIG. 1). So fluid pressure to be supplied to a side of front wheels is generated. The secondary piston 102b is pushed through the primary piston 102a and a return spring for the primary piston 102a by the rod member 12 and bolt 45, and it is moved leftwards. So fluid pressure to be supplied to a side of rear wheels is generated.

An outlet port 4a of the tandem master cylinder 4 is connected to one conduit 21 and the conduit 21 is divided into conduits 21a and 21b. They communicate with the wheel cylinders of brake apparatus 23a and 23b of front wheels. Another output port of the tandem master cylinder 4 is connected to a proportional control valve 60 for control of the fluid pressure. A brake conduit 22 is connected to the proportional control valve 60. The brake conduit 22 is divided into conduits 22a and 22b and they communicate with the wheel cylinders of brake apparatus 24a and 24b for the rear wheels. In this embodiment, the rear wheels are driven wheels.

Thus, in the conduits 21 and 22 an electro-magnetic valve apparatus 40 for an ASR control and an ABS hydraulic control unit 30 are arranged. The ABS hydraulic control unit 30 is common for the brake apparatus 23a, 23b, 24a, 24b for the front and rear wheels. And they are located at the divided conduits 21a, 21b, 22a and 22b. The ABS hydraulic control unit 30 further includes three-position three-port electro-magnetic change-over valves 35 and check valves 36 connected in parallel with the electric magnetic change-over valves 35 and low pressure hydraulic reservoirs 37 for restoring brake fluid discharged from the wheel cylinders. Brake fluid discharged into the hydraulic reservoir 37 is pressurized by two fluid pressure pumps 321 and 322 which are driven by one common electric motor 31, and the brake fluid is returned to the brake conduits 21 and 22. A check valve device 33 and a damping valve unit 34 are arranged between the output ports of the master cylinder 4 and the fluid pressure pumps 321, 322 to prevent the pulsation of the fluid pressure pumps 321, 322 transmiting to the master cylinder 4 side. When the pressure of the master cylinder 4 becomes higher than a predetermined pressure, the check valve device 33 is changed over to the position 33a in which fluid flow from the pump 321 side toward the master cylinder 4 side is cut out and the pulsation of the pump 321 is prevented from transmiting to the master cylinder 4 side. The check valve device 33 perfectly cuts the fluid flowing into the master cylinder 4 side. Accordingly, a high-pressure hydraulic reservoir 38 is arranged in the conduit 21. The pressurized fluid from the fluid pressure pump 321 is stored in the high-pressure hydraulic reservoir 38.

The damping valve unit 34 includes a throttle 34a connected in parallel with a check valve. The pulsation of the fluid pressure pump 322 is prevented from transmiting to the master cylinder side. The electro-magnetic change-over valve 35 in the ABS hydraulic control unit 30 is of the current control type. A ABS/ASR electronic controller M receives the input signals from sensors S which monitor the skid conditions of the rotations of the respective wheels. And it judges whether anyone of the wheels tend to lock or slip, or not. Further, it supplies a drive signal for the motor 31 for the pumps 321 and 322 and supplies control signals for changing over the valves 35, 41 and 42 through electric wipes (shown by dotted lines in FIG. 7). The control signals from the electronic controller m are supplied to the change-over valves 35. It is changed over into a brake holding condition, a brake relieving condition or brake applying condition in accordance with a current level of the control signal from the electronic controller m. The electro-magnetic change-over valves 35 are in the communicating conditions as shown in FIG. 7.

On the other hand, the electro-magnetic change-over valve apparatus 40 for the ASR control operation includes a first change-over valve 41 arranged in the brake condit 22 for the rear wheels as the driven wheels and a second change-over valve 42 arranged in a conduit connecting the side of the brake apparatus 24a, 24b and further the side of the valve 41 with the oil pressure source for the hydraulic booster part 50.

In the above-described manner, the brake fluid is discharged into the pressure relieving source from the pressure-servo chamber 29 and the reaction chamber 88. However, in contrast to the prior art, no abnormal sound is made, and the brake relieving operation is rapid.

The input member 9 is moved rightwards relative to the piston 19 and movable valve body 67 by the pressure of the reaction chamber 88 and spring force of the spring 86. Accordingly, the valve seat member 81 is separated from the rear end of the movable valve body 67. Thus, the discharge valve G is opened.

When the discharge valve G is opened, the pressurized fluid from the pressure-servo chamber 29 is discharged through the radial hole 83, the axial groove 84, the communicating chamber b and the through hole 67c into the reservoir side. The piston 19 is moved rightwards by spring action of the spring 48. The input member 9 is moved further rightwards, and the flang portion 9c of the input member 9 comes to contact with the retainer r for stop. After the input member 9 stops at the retainer r, the piston 9 still moves rightwards and it contacts with the retainer r.

With the movement of the piston 19, the spring 86 is compressed and the movable valve body 67 approaches the valve seat member 81. At last, it seats on the valve seat member 81. Thus, the discharge valve G closes as shown in FIG. 2 and FIG. 3. Also the supply valve E closes as shown in FIG. 2.

Before the discharge valve G closes, the pressure of the reaction chamber 88 becomes higher by more than the opening valve pressure of the valve H than that of the communicating chamber b, and so the valve H is opened. From that time, the brake fluid is discharged into the brake relieving source also from the reaction chamber 88.

However, the discharging amount of brake fluid flowing through the check valve H corresponding to the second valve apparatus of the hydraulic booster of the prior art is smaller than that of the prior art. Accordingly, no abnormal sound is made, and the brake relieving operation is smoothed.

Next, there will be described the details of the electro-magnetic valve apparatus 40 for the ASR control operation and of the damping valve unit 34.

Figure 8:
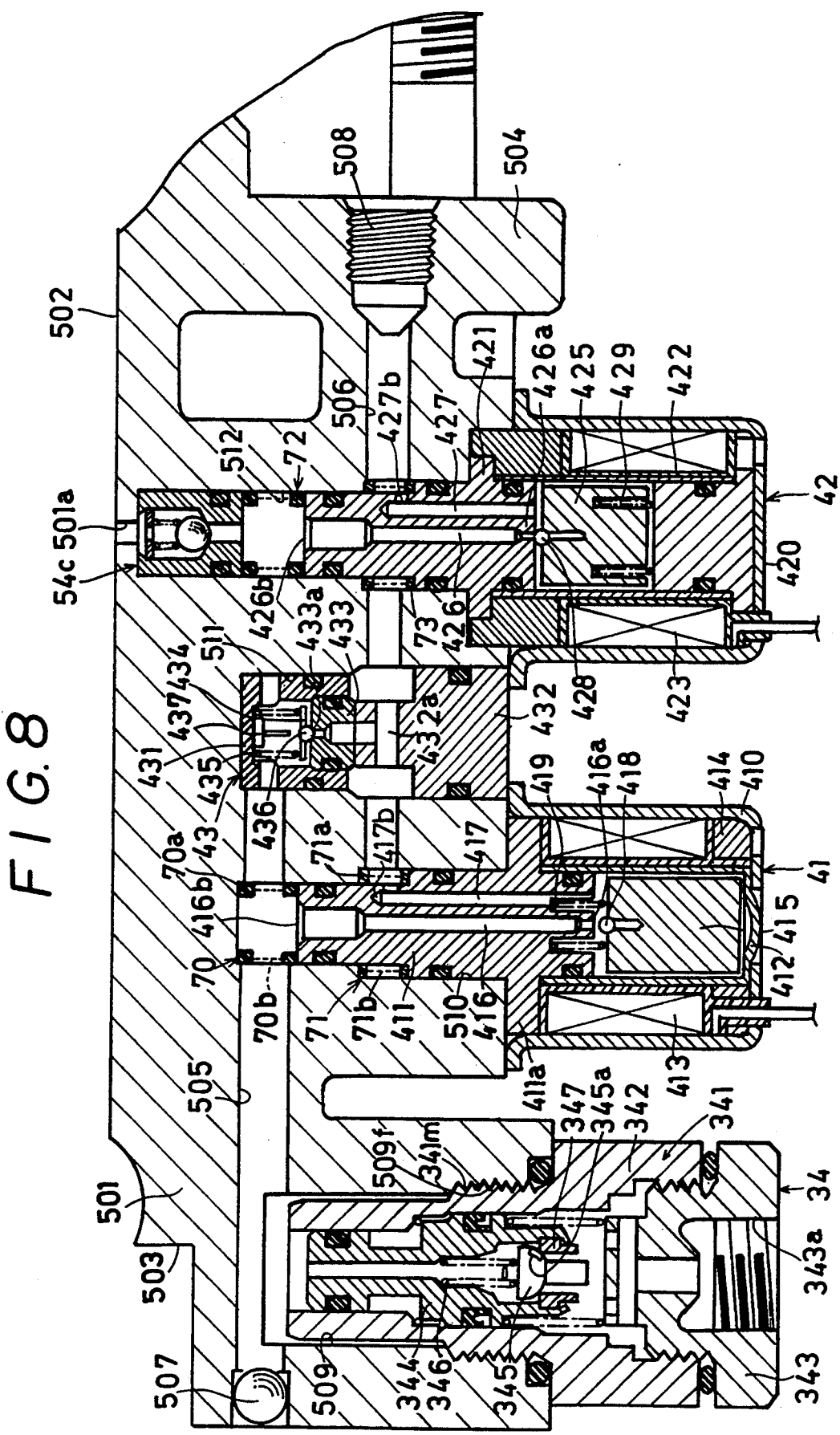
FIG. 8 is an enlarged cross-sectional view of the details of an important part of the brake control system shown in FIG. 7.

A wall portion 501 (FIG. 8) is a part of the cylinder body 2 of the hydraulic booster 1. A reference numeral 502 represents a part of the cylinder bore 5. The master cylinder 4 is combined at a stepped portion 503 of the cylinder bore portion 502 with the hydraulic booster part.

Axial paths 505 and 506 are formed in parallel with the cylinder bore portion 502, in the wall portion 501. Ends of the paths 505 and 506 are blocked with a ball 507 and a screw element 508, respectively. Mounting, respectively holes 509, 510, 511 and 512 for mounting the damping valve unit 34, a first change-over valve 41, the relief valve 43 and the second change-over valve 42, are formed in parallel with each other, and in intersection with the axial paths 505 and 506, respectively.

In the damping valve unit 34, a stepped plunger 344 is slidably fitted into a main body 341. A poppet-type valve body 345 is arranged at the lower end of the stepped plunger 344, urged by a valve spring 346. An output side of the proportional control valve 60 is connected through a steel conduit to a connecting port 343a of a cover member 343 screwed to the main body 341. A cut-out 345a is formed as the throttle 34a in the valve body 345.

The pressurized fluid from the master cylinder side pushes up the valve body 345 and so it can freely flow towards the axial path 505. Accordingly, the cut-out 345a does not function as throttle.

However, the cut-out 345a functions as throttle for the pressurized flow from the ABS hydraulic control unit 30. Accordingly, the pulsation of the fluid pressure pump 322 can be effectively damped.

When the pressure of the master cylinder 4 is decreased to relieve the brake, the stepped plunger 344 is moved towards the cover member 343 by the pressure difference between the end surfaces. The valve body 345 is separated from a valve seat member 347. The throttle action of the cut-out 345 is released, and the pressurized fluid can be rapidly returned into the master cylinder side.

In the first change-over valve 41, a stator block 411 is fixedly fitted into the mounting hole 510, and vertical paths 416 and 417 are formed therein. A valve ball 418 is fixed on the top of a magnetic plunger 415 which is driven by a solenoid 413. The first change-over valve 41 is normally open.

When the solenoid 413 is energized by an ASR control signal from the electronic controller m, the plunger 415 is moved upwards, and the ball 418 comes to seat on a valve seat 416a. An opening 416b of the vertical path 416 communicates through the axial path 505 with the side of the damping valve 34. On the other hand, an opening 417b of the vertical path 417 communicates through the second axial path 506 with the side of the second change-over valve 42.

In the relief valve 43, a plug member 432 is fixedly fitted into the mounting hole 511. A T-shaped path 432a is formed in the plug member 432. A ball 436 normally seats on a top end of a vertical portion of the T-shaped path 432a, urged by a valve spring 435. The T-shaped path 432a communicates with the side of the ABS hydraulic control unit 30. When the pressure of the side of the hydraulic control unit 30 is excessively increased, the ball 436 is separated from a valve seat 433a, and high pressurized fluid is relieved into the axial path 505.

In the second change-over valve 42 and the check valve 54c, a stator block 421 is fixedly fitted into the mounting hole 512, and a body for the check valve 54c is arranged above the stator block 421. Vertical paths 426 and 427 are formed in the stator block 421. A ball 428 fixed on a magnetic plunger 425 seats normally on the lower end of the vertical path 426. Accordingly, the paths 426 and 427 are cut off from each other. A top end opening 426b of the vertical path 426 communicates with the piston type accumulator 54b, while a top end opening 427b of the vertical path 427 communicates with the axial path 506. A path 501a above the check valve 54c communicates with the side of the accumulator 54a. When a solenoid 423 is energized by an ABS control signal, the plunger 425 is moved downwards and the ball 428 is separated from the lower end of the vertical path 426. The paths 426 and 427 thus are made to communicate with each other.

While the preferred embodiment has been described, variations thereto will occur to those skilled in the art within the scope of the present inventive concepts which are delineated by the following claims.

For example, in the above embodiment the discharge valve G is constituted by the tapered recess 78 formed on the valve seat member 81, and the rear end of the movable valve body 67. However, a well-known valve construction may be used as the discharge valve G instead of the illustrated construction. Further, this invention may be applied to a prior art hydraulic booster including a reaction chamber, not limited to the illustrated hydraulic booster 1.

In the above embodiment, the valve lift between the rear end of the movable valve body 67 and the tapered recess 78 of the valve seat member 81, or the valve lift of the discharge valve G is zero. Thus, the rear end of the movable valve body 67 contacts with the valve seat 78 of the recess member 81 in the non-operating condition. However, the valve lift of the discharge valve G does not always need to be zero. In other words, the rear end of the movable valve body 67 may be separated by a certain value l from the recess 78 of the valve seat member 81. In that case, the chamber 95 communicating with the pressure-servo chamber 29 may communicate with the reaction chamber 88, through the annular groove 80a to which the seal member 97 is fitted. For example, an annular groove is made in the peripheral wall of the input member 9, facing to the annular groove 80a, and a space $l_1$, smaller than l is made between the seal member 97 and the backward inside wall portions of the annular grooves of the input member 9 and the sleeve member 80 in the non-operating condition. When the driver depresses the brake pedal, the reaction chamber 88 is first cut off from the chamber 95, and then the valve seat 78a is made to contact with the rear end of the movable valve body 67.

What is claimed is:

1. A hydraulic booster for a vehicle, comprising:
   (A) a cylinder body having a cylindrical bore;
   (B) a piston slidably fitted into said cylindrical bore;
   (C) a pressure-servo chamber formed at one side of said cylindrical bore by said piston;
   (D) a valve hole made in a side of said pressure-servo chamber in said piston;
   (E) pressure supply path means extending into said valve hole and communicating with a fluid pressure source;
   (F) pressure discharge path means extending into said valve hole and communicating with a pressure-relieving source;
   (G) an input member passing through said pressure-servo chamber and entering said valve hole or movement thereinto when input pressure is applied to said input member;
   (H) pressure-supply valve means arranged in said valve hole for opening and closing the path between said pressure supply means and said pressure-servo chamber in response to the movement of said input member;
   (I) pressure-discharge valve means arranged in said valve hole for opening and closing the path between said pressure discharge path means and said pressure-servo chamber in response to the movement of said input member;
   (J) a reaction chamber in which said input member is able to receive the pressure-servo chamber side pressure of said pressure-supply valve means in a direction against the input direction of said input member; and
   (K) valve apparatus arranged in a path to said reaction chamber and preventing fluid pressure from transmitting into said reaction chamber at a lower fluid pressure than a predetermined pressure, wherein by-pass means is arranged for connecting said pressure-servo chamber with said pressure-discharge valve means without passing through said reaction chamber, said path to the reaction chamber is formed as an axial path in a sleeve member securely fitted into said piston, communicating with said pressure supply path means, said valve apparatus is a check valve arranged in said path, and a second axial path is formed in said sleeve member so as to make said reaction chamber communicate with said pressure supply path means, and a second check valve is arranged in said second axial path, permitting fluid to flow from said reaction chamber towards said pressure-supply path means, whereby fluid only from said pressure-servo chamber flows through said by-pass means when input pressure applied to said input means is relieved.

2. A hydraulic booster for vehicle according to claim 1, in which said pressure-supply valve means includes a movable valve body, a valve guide member securely fitted into said piston, one end portion of said movable valve body being slidably fitted through an axial hole of said valve guide member, a valve seat formed at one end of said axial hole of the valve guide member and an annular projection formed on said movable valve body being able to seat on said valve seat.

3. A hydraulic booster for vehicle according to claim 2, in which said pressure-discharge valve means includes said movable valve body, a through axial hole made in said movable valve body, a valve seat member facing to a top end of said movable valve body and slidably fitted into a top end portion of said input member and a spring urging said valve seat member to said input member.

4. A hydraulic booster for vehicle according to claim 3, in which said top end of the movable valve body seats on said valve seat member in the inoperative condition.

5. A hydraulic booster for a vehicle, comprising:
   (A) a cylinder body having a cylindrical bore;
   (B) a piston slidably fitted into said cylindrical bore;
   (C) a pressure-servo chamber formed at one side of said cylindrical bore by said piston;
   (D) a valve hole made in a side of said pressure-servo chamber in said piston;
   (E) pressure supply path means extending into said valve hole and communicating with a fluid pressure source;
   (F) pressure discharge path means extending into said valve hole and communicating width a pressure-relieving source;
   (G) an input member passing through said pressure-servo chamber and entering said valve hole;
   (H) pressure-supply valve means arranged in said valve hole for opening and closing the path between said pressure supply means and said pressure-servo chamber in response to the movement of said input member;
   (I) pressure-discharge valve means arranged in said valve hole for opening and closing the path between said pressure discharge path means and said pressure-servo chamber in response to the movement of said input member;
   (J) a reaction chamber in which said input member is able to receive the pressure-servo chamber side pressure of said pressure-supply valve means in a direction against the input direction of said input member; and
   (K) valve apparatus arranged in a path to said reaction chamber and preventing fluid pressure from transmitting into said reaction chamber at a lower fluid pressure than a predetermined pressure, wherein by-pass means is arranged for connecting said pressure-servo chamber with said pressure-discharge valve means without passing through said reaction chamber and said by-pass means comprises a radial hole made in said sleeve member, an axial groove made therein and another hole made in one end portion of said piston, communicating with said axial groove.

6. A hydraulic booster for a vehicle according to claim 5, in which said pressure-supply valve means includes a movable valve body, a valve guide member securely fitted into said piston, one end portion of said movable valve body being slidably fitted through an axial hole of said valve guide member, a valve seat formed at one end of said axial hole of the valve guide member and an annular projection formed on said movable valve body being able to seat on said valve seat.

7. A hydraulic booster for a vehicle according to claim 5, in which said pressure-discharge valve means includes said movable valve body, a through axial hole made in said movable valve body, a valve seat member facing to a top end of said movable valve body and slidably fitted into a top end portion of said input member and a spring urging said valve seat member to said input member.

8. A hydraulic booster for a vehicle according to claim 7, in which said top end of the movable valve body seats on said valve seat member in the inoperative condition.

* * * * *